July 14, 1964
L. STARK
3,140,691
FISH BREEDER TRAP
Filed Aug. 21, 1963
2 Sheets-Sheet 1
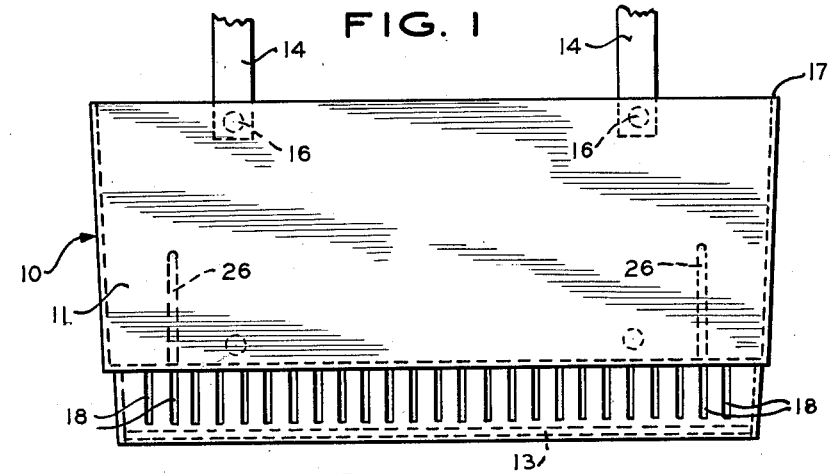
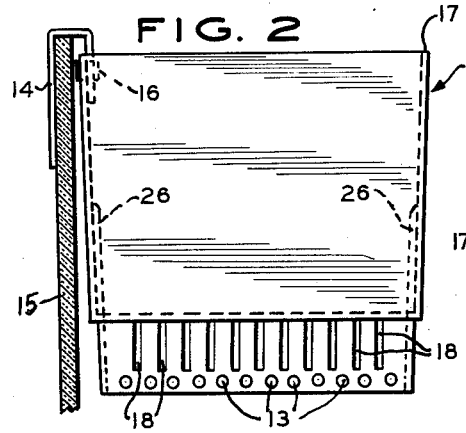
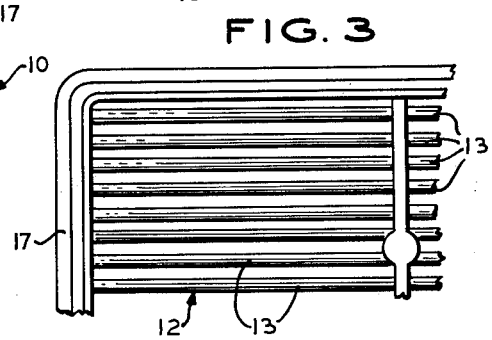
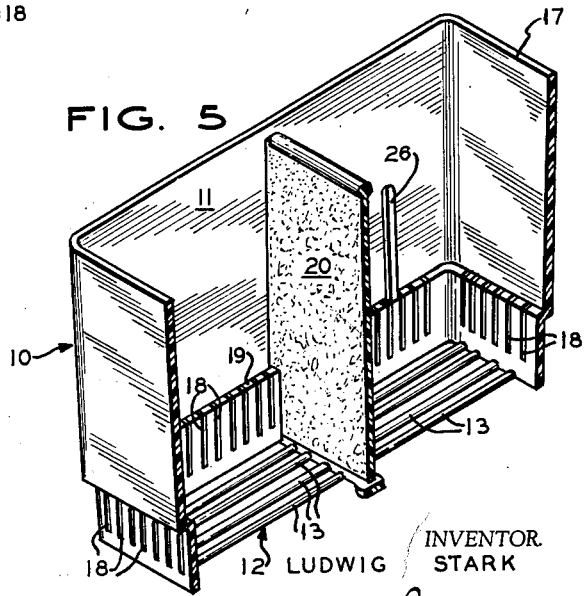
INVENTOR.
LUDWIG STARK
BY
ATTORNEY

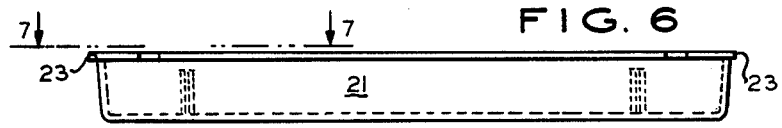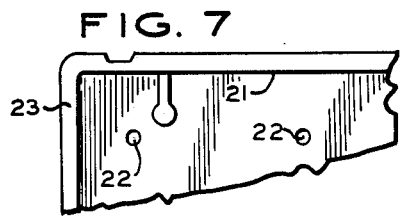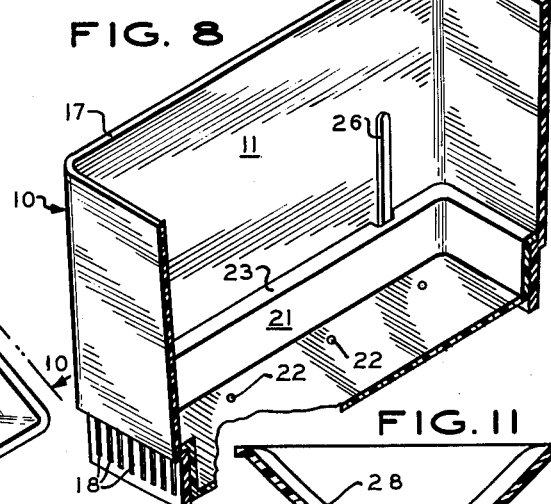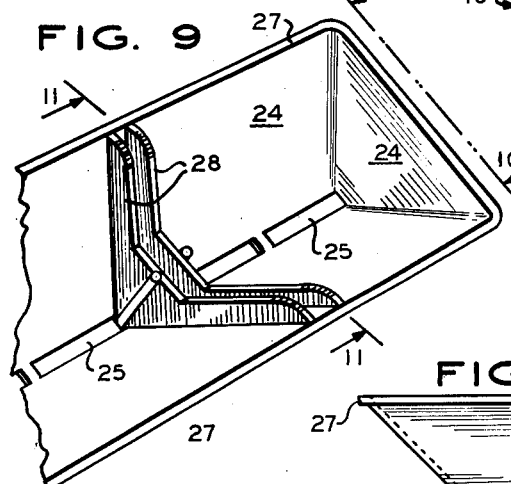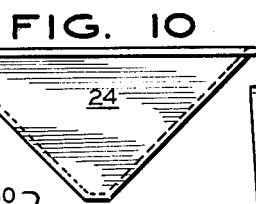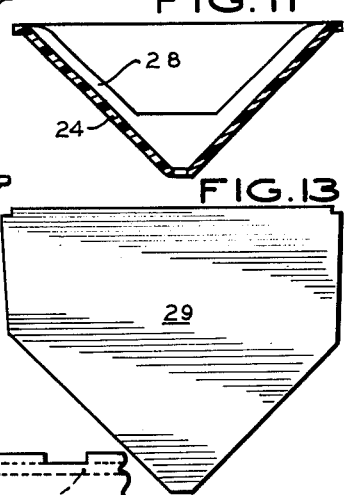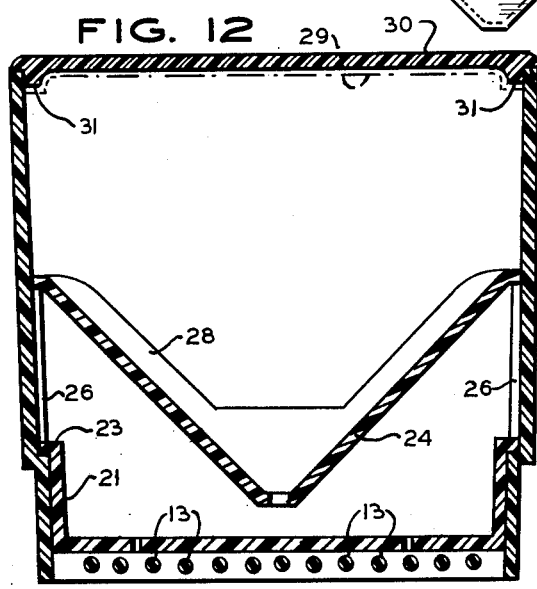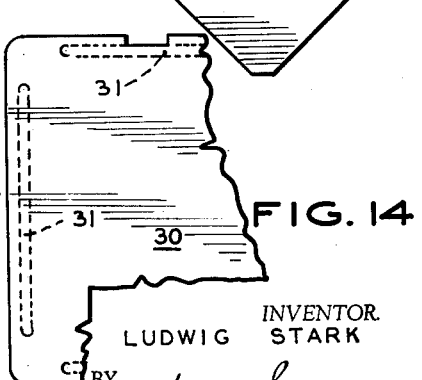

3,140,691
FISH BREEDER TRAP
Ludwig Stark, Springfield, N.J., assignor to Springfield Tool & Die Co., Inc., Springfield, N.J., a corporation of New Jersey
Filed Aug. 21, 1963, Ser. No. 303,494
4 Claims. (Cl. 119—5)

This invention relates to a fish breeder trap adapted to be manufactured as a single unit with interfitting parts such as to adapt the device to several uses, so that the purchaser need incur only a single initial cost, the device being readily adaptable to uses such as below set forth and illustrated in accompanying drawings. Thus the breeder trap of this invention is adapted, in rapid and simple fashion, for use as a double betta display for betta breeding or double rod breeding trap, as a baby tank or single betta display in an aquarium, as a double V-breeding trap, as a single V-breeding trap, and as a single rod breeding trap.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is a side elevational view of a fish breeder trap casing embodying the invention, showing, fragmentarily, hangers for supporting the same on the edge of a tank, FIG. 2 is an end elevational view thereof, showing the casing mounted on the tank wall, the latter shown fragmentarily, FIG. 3 is a fragmentary top plan view of a corner of the outer casing, FIG. 4 is a side elevational view of a separator plate, FIG. 5 is a fragmentary perspective view of the outer casing, with a separator plate shown positioned therein for double betta display, betta breeding or double rod breeding trap, FIG. 6 is a side elevational view of a tray for the bottom of a casing, FIG. 7 is a fragmentary plan view thereof, taken at line 7—7 of FIG. 6, FIG. 8 is a fragmentary perspective view of the casing, with the tray shown positioned therein and closing the bottom thereof, FIG. 9 is a fragmentary perspective view of a breeding trough, FIG. 10 is an end elevational view thereof, taken at line 10—10 of FIG. 9, FIG. 11 is a transverse sectional view thereof, taken at line 11—11 of FIG. 9, FIG. 12 is a similar view, taken medially through the outer casing, showing the breeding trap positioned therein in association with the other parts thereof, and showing, in dotted lines, the position of the V-separator of FIG. 13 therein, FIG. 13 is an end elevational view of a V-separator adapted to be positioned medially in the V-trap of FIG. 9, and FIG. 14 is a fragmentary top plan view of a cover member for closure of the casing.

In the manufacture of the device of this invention, I have found the use of plastic materials desirable; in addition to ease of manufacture and the lowering of the cost of production, and providing excellent control over the form of the parts and their adaptability, the plastic materials may be made slightly translucent and given a very light green or other color if desired. However, the invention is not limited to use of any plastic or other material.

The drawings illustrate a breeder trap pursuant to this invention, comprising a casing 10 having a side wall 11 and an apertured bottom wall 12 which (FIG. 3) may be formed of parallel spaced rods 13 unitarily or otherwise formed with casing 10.

The hangers 14 are secured to the casing adjacent the upper end thereof by any suitable means 16 (FIG. 2), and (FIG. 1) may be bent, as in FIG. 2, over the upper edge 17 of the casing 10 and tank 15 to thereby suspend the casing 10 inwardly thereof.

The bottom of the casing may be apertured at the side wall thereof, as indicated at 18 (FIG. 2) in a shouldered portion 19 (FIG. 5) spaced from the bottom of the casing (for a purpose presently described) also enhancing the flow of tank fluid therethrough. A separator or partition plate 20 (FIG. 4) may be disposed in the tank medially the length thereof (FIG. 5) for double-betta breeding or double rod breeding trap. The apertures 18, formed in shouldered portion 19 adjacent the bottom of the casing (as above noted) may define slots or complementary means for removably receiving the casing partition plate 20 for the purpose above described. The casing may be used as a baby tank or single betta display in an aquarium, with only the tray 21 (FIGS. 6 and 8) disposed therein, said tray being registered with the shouldered portion 19 of the casing (FIG. 8). The tray is essentially solid except for a number of small apertures 22 to thus (FIG. 8) effectively close the apertured portions 13 and 18 of the casing. The tray is preferably provided with marginal portion 23 for closing registration with the shouldered apertured portion 19 (FIG. 5) of casing 10.

For use of the casing as a double V-breeding trap, the tray is left in place and the V-trough 24 (FIG. 9) is positioned in the casing above the tray (FIG. 12). The trough is of V-formation transversely of its length, and has (FIG. 9) medial apertures 25 formed at the bottom thereof. Support ribs 26 (FIGS. 1 and 8) are formed on the side walls 11 of the casing for supporting the V-trough in spaced relation to the tray in the casing. The trough may be provided with a marginal flange 27 (FIG. 10) adapted for registry with the support ribs 26 for positioning the trough, as above noted, in spaced relation to tray 21 (FIG. 12).

The trough member 24 may be provided intermediate its length, with a holder 28 for a trough separator plate 29 (FIG. 13) to be positioned in the holder 28 as indicated in dotted lines in FIG. 12, thus enabling the device to be used as a double V-breeding trap. The separator plate may be removed from the trough 24 for use of the device as a single V-breeding trap, the other parts being in such case as full lines shown in FIG. 12. For use of the device as a single rod breeding trap, the casing 10 alone may be used as shown in FIGS. 1–3.

A top 30, as seen in FIG. 12, is provided to rest on the upper edge of the casing 11 and is oriented thereon by shoulders 31 to close the casing.

Having thus described my invention, what I claim as new and desire to secure by Letters Patent is:

1. A multi purpose fish breeder comprising a casing having an open top, said casing having a bottom wall formed with a plurality of apertures therein, support means on the casing sides, a trough member adapted to be removably positioned in the casing on said support means in spaced relation to the bottom wall of the casing, said trough being of V-form transversely of its length, an aperture formed at the bottom of the trough, said tank having shouldered means formed therein adjacent the bottom thereof and a bottom closure tray adapted to be removably positioned on the shouldered means of the tank wall to thereby close the bottom of the casing.

2. In a multi purpose fish breeder tank as set forth in claim 1, the bottom of said casing being formed of spaced parallel rods defining said apertures therebetween.

3. In a multi purpose fish breeder tank as set forth in claim 1, a partition member adapted to be medially received in the trough and to divide the same lengthwise thereof.

4. In a multi purpose fish breeder tank as set forth in claim 1, a partition member and complementary means in said casing to removably receive the same.

References Cited in the file of this patent
UNITED STATES PATENTS
2,782,161    Willinger et al. _____ Feb. 19, 1957